United States Patent
Tokawa et al.

(10) Patent No.: US 8,651,775 B2
(45) Date of Patent: Feb. 18, 2014

(54) VIBRATION-REDUCTION MECHANISM FOR GEAR CUTTING MACHINE

(75) Inventors: Takahide Tokawa, Ritto (JP); Kazutaka Maruyama, Ritto (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 1066 days.

(21) Appl. No.: 12/602,029

(22) PCT Filed: Nov. 18, 2008

(86) PCT No.: PCT/JP2008/070887
§ 371 (c)(1),
(2), (4) Date: Jan. 20, 2010

(87) PCT Pub. No.: WO2009/069497
PCT Pub. Date: Jun. 4, 2009

(65) Prior Publication Data
US 2010/0172707 A1 Jul. 8, 2010

(30) Foreign Application Priority Data
Nov. 27, 2007 (JP) .................................. 2007-305319

(51) Int. Cl.
*B23F 5/16* (2006.01)
(52) U.S. Cl.
USPC .................................. 408/41; 74/603; 74/604
(58) Field of Classification Search
USPC ........... 409/5, 31, 33, 34, 42, 46, 58, 49, 141, 409/41; 74/572.2, 574.2, 574.4, 572.21, 74/589, 604, 603
See application file for complete search history.

(56) References Cited

U.S. PATENT DOCUMENTS

| | | | | |
|---|---|---|---|---|
| 3,808,912 A | * | 5/1974 | Voorhees et al. | 74/604 |
| 4,791,830 A | * | 12/1988 | Yamamoto et al. | 74/603 |
| 4,966,042 A | * | 10/1990 | Brown | 74/44 |

FOREIGN PATENT DOCUMENTS

| | | |
|---|---|---|
| JP | 58-35386 Y2 | 8/1983 |
| JP | 60-45640 U | 3/1985 |
| JP | 61-97643 U | 6/1986 |
| JP | 61-97644 U | 6/1986 |
| JP | 61-117938 U | 7/1986 |
| JP | 61-154348 U | 9/1986 |

* cited by examiner

*Primary Examiner* — Andrea Wellington
*Assistant Examiner* — Mohammad Nourbakhsh
(74) *Attorney, Agent, or Firm* — Birch, Stewart, Kolasch & Birch, LLP

(57) ABSTRACT

A vibration-reduction mechanism for a gear cutting machine is provided with a vibration-reduction mechanism that includes balancer shafts arranged in parallel to a crank shaft. The balancer shafts rotate synchronously with the crank shaft at the same speed as the speed of the crank shaft. One balancer shaft rotates in the opposite direction to the rotational direction of the crank shaft while the other balancer shaft rotates in the same direction as the rotational direction of the crank shaft. The vibration-reduction mechanism also includes: main balancer weights detachably attached onto the crank shaft; and sub balancer weights detachably attached onto the balancer shafts. The balancer weights are selected on the basis of a stroke width of the main shaft and on the basis of a lead corresponding to the helical angle to be formed in the workpiece W.

3 Claims, 5 Drawing Sheets

VIBRATION-REDUCTION MECHANISM FOR GEAR CUTTING MACHINE

BACKGROUND OF THE INVENTION

1. Field of the Invention

The present invention relates to a vibration-reduction mechanism for a gear cutting machine that performs gear cutting on a gear blank with a rotary tool attached to a main shaft made to move reciprocally by a crank mechanism.

2. Description of the Related Art

Gear cutting machines, such as gear shapers, are provided as conventional machines to perform gear cutting on a gear blank with a rotary tool. When a gear cutting machine of this type is used, a workpiece (gear blank) is formed into a desired gear shape by making a rotary cutter (rotary tool) and the rotating workpiece mesh with each other and then making the cutter move reciprocally in the axial direction of the workpiece.

The reciprocating motion of the cutter is achieved by making a main shaft to which the cutter is attached move in its axial direction by moving a crank of a crank mechanism. Such reciprocating motion of the main shaft, however, produces vibrations in the machine due to the inertial force of the main shaft and the like. The vibrations may possibly affect negatively the machining accuracy. Accordingly, as a countermeasure for such vibrations in conventional gear cutting machines, a balancer weight is provided on the outer perimeter of a crank shaft of the crank mechanism (see, Patent Document 1).

The conventional gear cutting machines are capable of changing the stroke width of the reciprocating motion of the cutter so as to deal with workpieces of various face widths. The changing of the stroke width is naturally accompanied by the changing of the magnitude of the vibrations caused by the reciprocating motion of the main shaft. Accordingly, various gear cutting machines are provided with vibration-reduction mechanisms to adjust easily the weight of the balancer weight in accordance with the stroke width (see Patent Documents 2 to 4).

[Patent Document 1] Japanese Utility Model Application Laid-open Publication No. Sho 60-45640
[Patent Document 2] Japanese Examined Utility Model Publication No. Sho 58-35386
[Patent Document 3] Japanese Utility Model Application Laid-open Publication No. Sho 61-97643
[Patent Document 4] Japanese Utility Model Application Laid-open Publication No. Sho 61-97644

SUMMARY OF THE INVENTION

When a workpiece is to be formed into a helical gear, the main shaft has to be twisted so that the lead can correspond to the helical angle. Accordingly, the main shaft performs a twisting (spiral) motion with a predetermined lead angle corresponding to the specifications of the helical gear into which the workpiece is to be formed. The twisting motion that the main shaft always performs during its reciprocating motion produces an inertial force attributable to the twisting motion of the main shaft.

However, the twisting motion of the main shaft in the balance of forces achieved by the balancer weight is not taken into account in the design of conventional vibration-reduction mechanisms. Accordingly, when the workpiece is formed into a helical gear, the vibration reduction may not be achieved with certainty.

The present invention aims to solve the above-mentioned problem. An object of the present invention is, therefore, to provide a vibration-reduction mechanism for a gear cutting machine capable of reducing mechanical vibrations in the gear cutting of a helical gear by selecting an optimal balancer weight.

Means for Solving Problems

A vibration-reduction mechanism for a gear cutting machine according to a first invention to solve the above-described problem is a vibration-reduction mechanism for a gear cutting machine that performs gear cutting on a gear blank with a rotary tool attached to a main shaft made to move reciprocally by a crank mechanism, the vibration-reduction mechanism characterized by comprising:

a first balancer shaft and a second balancer shaft which are arranged in parallel to a crankshaft of the crank mechanism, and which rotate synchronously with the crank shaft at a same speed as a speed of the crank shaft, the first balancer shaft rotating in an opposite direction to a rotational direction of the crank shaft and the second balancer shaft rotating in a same direction as the rotational direction of the crank shaft;

main balancer weights detachably attached onto the crank shaft so as to reduce vibrations in an axial direction of the main shaft; and sub balancer weights detachably attached onto the first and the second balancer shafts so as to reduce vibrations in directions that are orthogonal to the axial direction of the main shaft, characterized in that the main balancer weights and the sub balancer weights are selected on the basis of a stroke width of the main shaft and on the basis of a helical angle to be formed in the gear blank.

A vibration-reduction mechanism for a gear cutting machine according to a second invention to solve the above-described problem is the vibration-reduction mechanism for a gear cutting machine according to the first invention characterized in that the main balancer weights include:
a front-side balancer weight having a phase being offset by 180° from a phase of the main shaft eccentrically supported with respect to a center of the crank shaft; and
a rear-side balancer weight having a phase being offset by 180° from the phase of the front-side balancer weight so as to solve an imbalance caused by the offset, in an axial direction of the crank shaft, between the position of a mass center of the main shaft and the position of a mass center of the front-side balancer weight.

A vibration-reduction mechanism for a gear cutting machine according to a third invention to solve the above-described problem is the vibration-reduction mechanism for a gear cutting machine according to any one of the first and the second inventions characterized in that the sub balancer weights are disposed, in the axial direction of the crank shaft, at same positions as the position of the mass center of the main shaft in the axial direction of the crank shaft.

Effects of the Invention

According to the vibration-reduction mechanism for a gear cutting machine of the present invention, the mechanical vibrations can be reduced with certainty by taking the twisting motion of the main shaft in accordance with the helical angle to be formed in the gear blank into consideration when each balancer weight is selected.

DETAILED DESCRIPTION OF THE INVENTION

Figure 1:
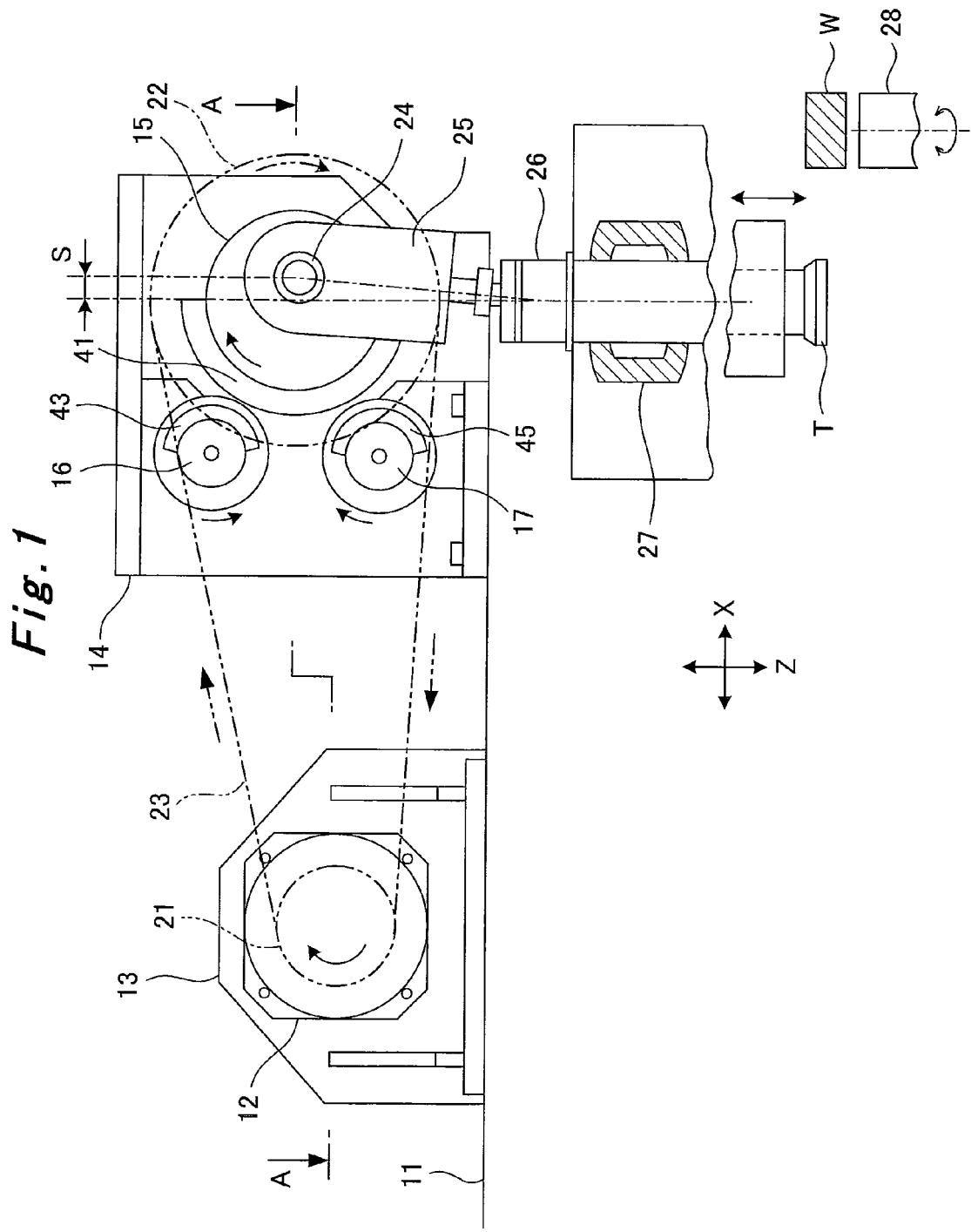
FIG. 1 is a front elevation illustrating a vibration-reduction mechanism for a gear cutting machine according to an embodiment of the present invention.
Figure 2:
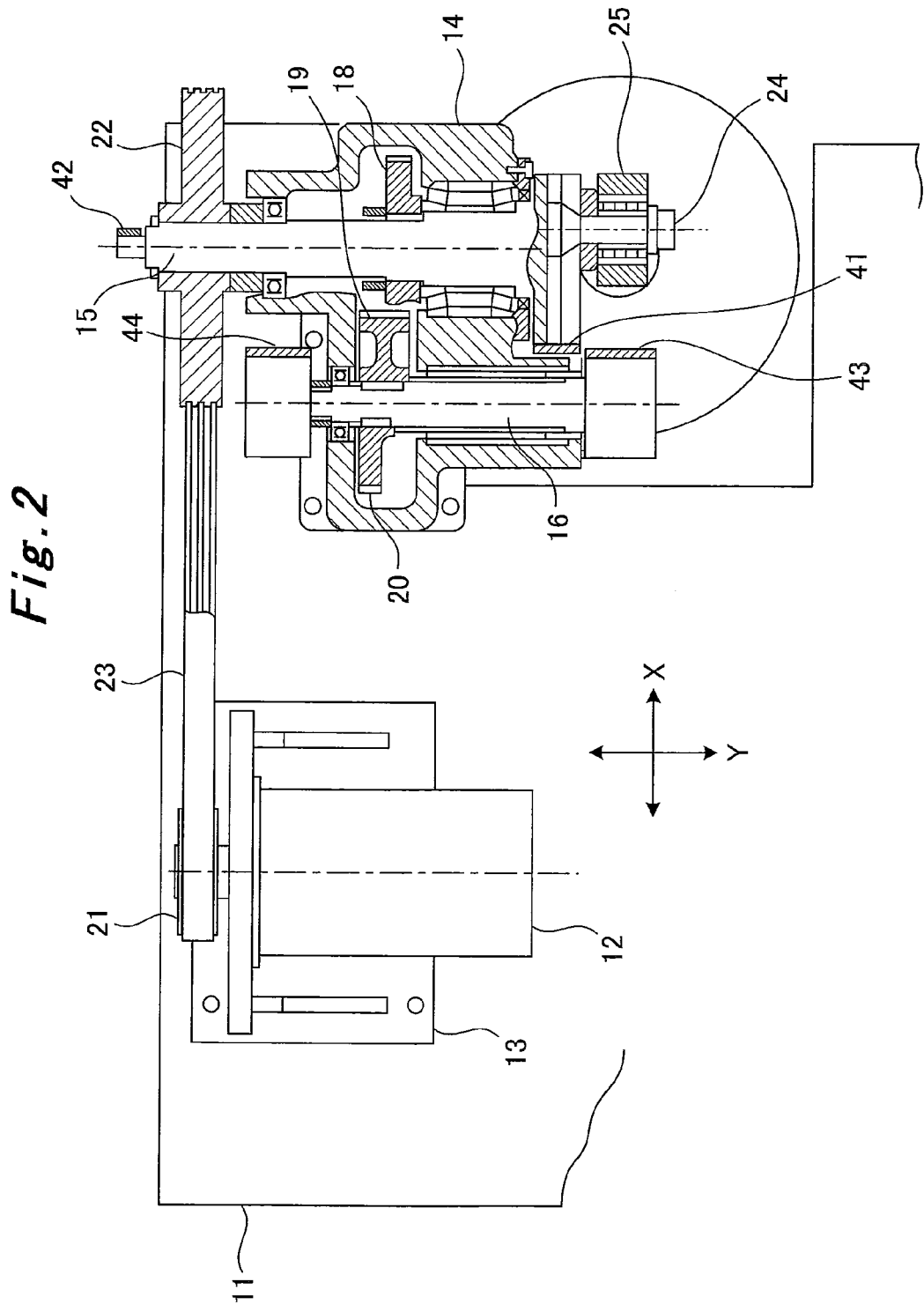
FIG. 2 is a sectional view taken along and seen as indicated by the arrow line A-A of FIG. 1.
Figure 3:
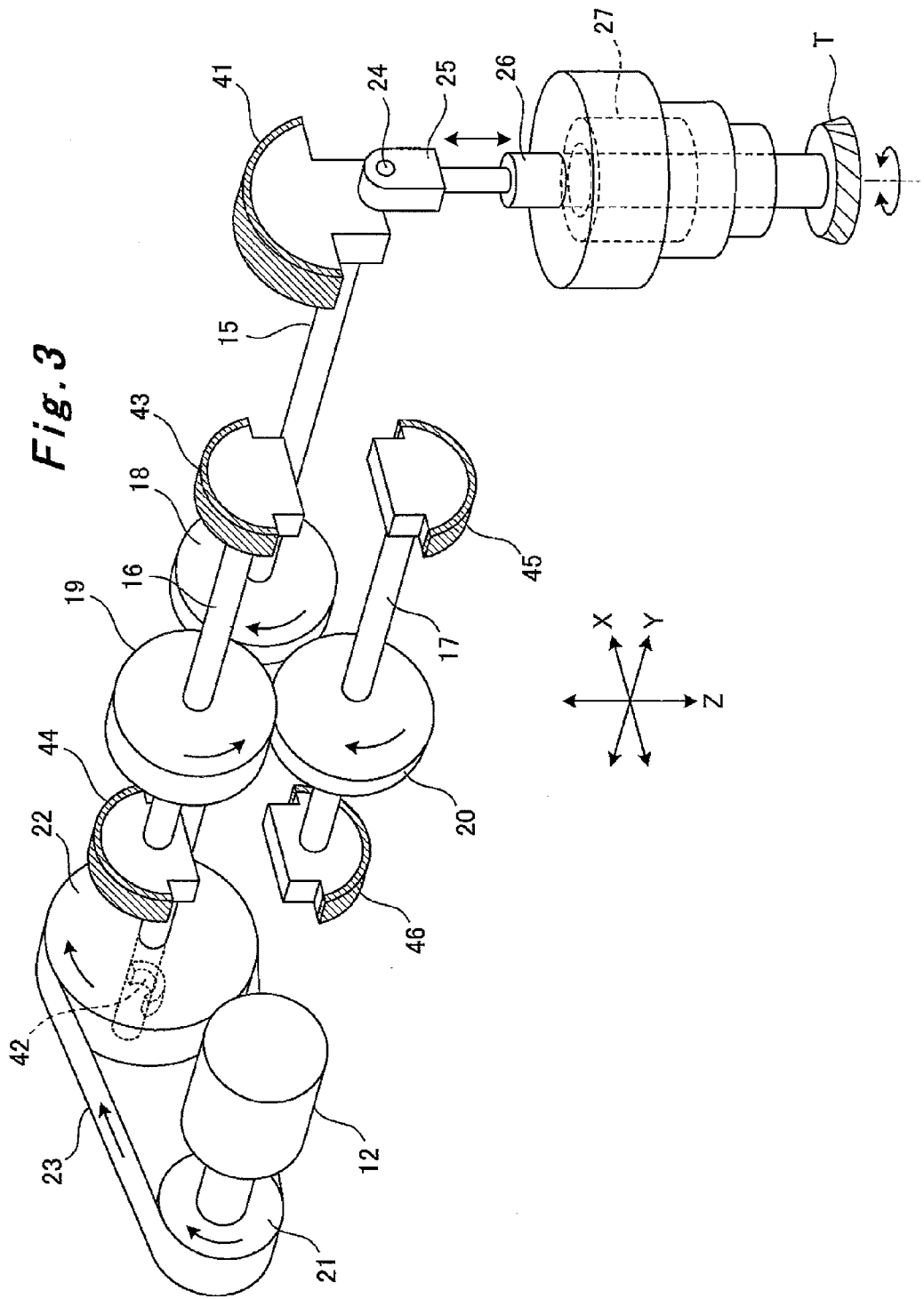
FIG. 3 is a general configuration diagram of the vibration-reduction mechanism.
Figure 4:
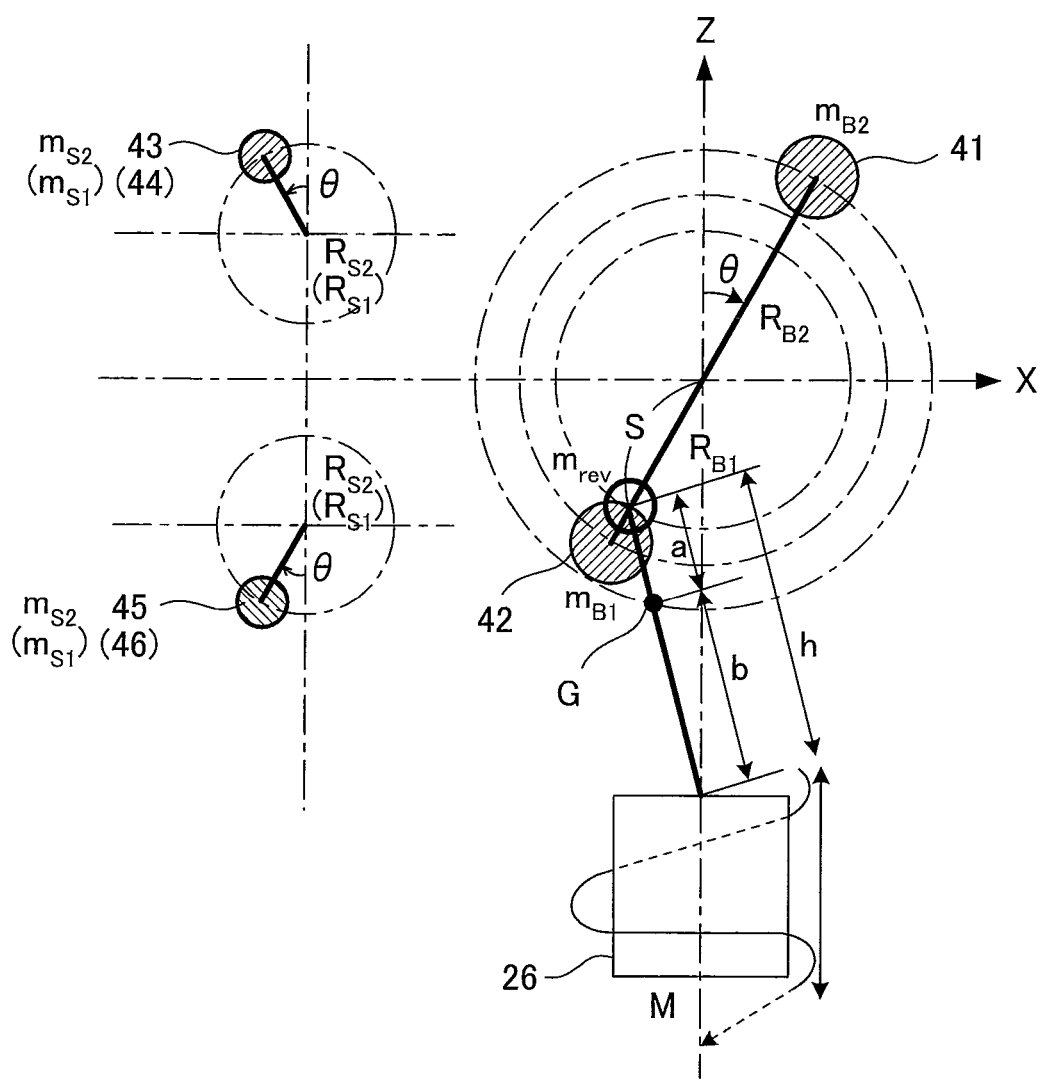
FIG. 4 is a front elevation illustrating the basic principle of the vibration-reduction mechanism.
Figure 5:
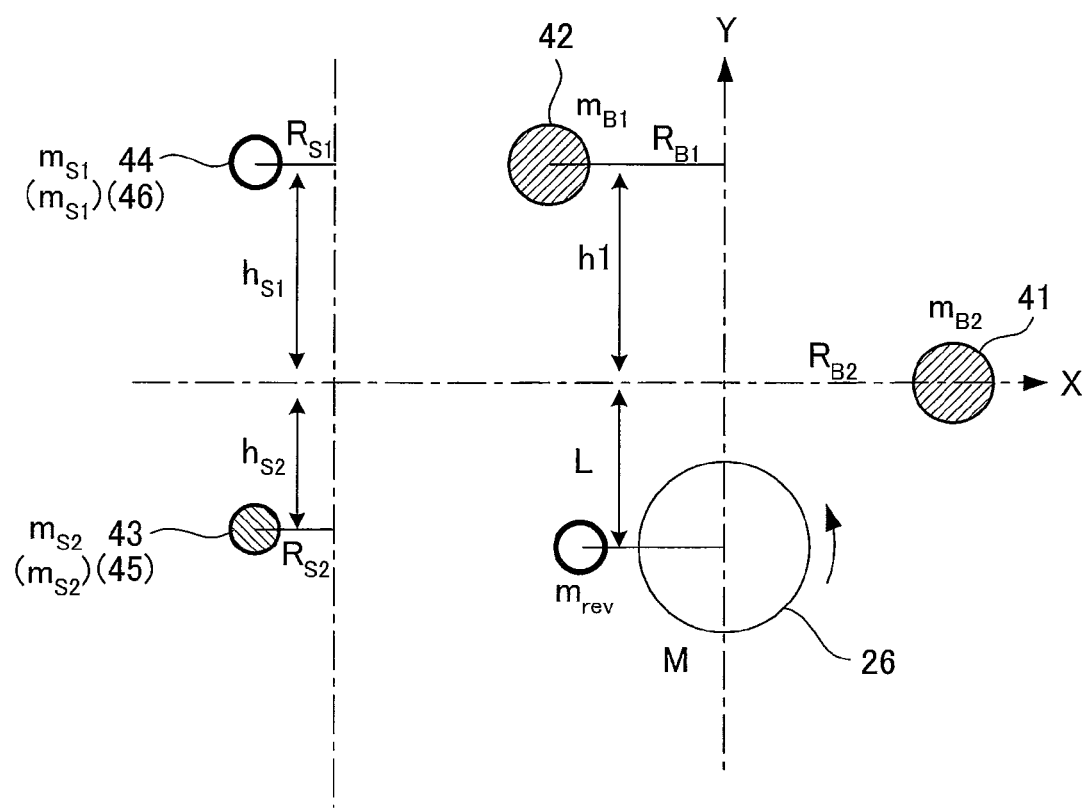
FIG. 5 is a top plan view illustrating the basic principle of the vibration-reduction mechanism.

A vibration-reduction mechanism for a gear cutting machine according to the present invention will be described in detail below with reference to the drawings. FIG. 1 is a front elevation illustrating a vibration-reduction mechanism for a gear cutting machine according to an embodiment of the present invention. FIG. 2 is a sectional view taken along and seen as indicated by the arrow line A-A of FIG. 1. FIG. 3 is a general configuration diagram of the vibration-reduction mechanism. FIG. 4 is a front elevation illustrating the basic principle of the vibration-reduction mechanism. FIG. 5 is a top plan view illustrating the basic principle of the vibration-reduction mechanism.

The gear cutting machine equipped with a vibration-reduction mechanism that FIGS. 1 to 3 show is a gear shaper to perform the shaping of a workpiece W into, for example, a helical gear. Note that the X-axis, Y-axis, and Z-axis in the drawings are three axes that orthogonally intersect one another. The X-axis direction is the direction along the horizontal width of the machine, the Y-axis direction is the direction along the horizontal length of the machine, and the Z-axis direction is the vertical direction.

As FIGS. 1 to 3 show, the gear cutting machine includes a column 11. A main-shaft motor 12 is attached to the top surface of the column 11 with a bracket 13. A gear box 14 is provided so as to be opposed to the main-shaft motor 12.

Inside the gear box 14, a crank shaft 15, and balancer shafts 16 and 17 are rotatably supported so as to be in parallel to one another. Gears 18, 19, and 20 are provided respectively on the crank shaft 15 and the balancer shafts 16 and 17. The gear 18 on the crank shaft 15 meshes with the gear 19 on the balancer shaft 16 while the gear 19 on the balancer shaft 16 meshes with the gear 20 on the balancer shaft 17.

The gear 18 and the gear 20 are offset from each other in the Y-axis direction. Accordingly, the gear 18 and the gear 20 do not interfere with each other even while these gears 18 and 20 are rotating. In addition, the gear ratio between every two of the gears 18, 19, and 20 is set at 1 to 1, so that all the crank shaft 15 and the balancer shafts 16 and 17 rotate at the same speed. Specifically, when the crank shaft 15 rotates, the rotation is transmitted to the balancer shaft 16, the rotation of which is then transmitted to the balancer shaft 17. In this event, the crank shaft 15 and the balancer shaft 16 rotate in the opposite directions to each other while the crank shaft 15 and the balancer shaft 17 rotate in the same direction. In addition, when the crank shaft 15 rotates by an angle $\theta$, each of the balancer shafts 16 and 17 rotates by the angle $\theta$, as well.

A motorized pulley 21 is provided on the output shaft of the main-shaft motor 12. A pulley 22 is provided on the rear end of the crank shaft 15. A timing belt 23 is looped around the motorized pulley 21 and the pulley 22.

A connecting rod 25 is supported on the front end of the crank shaft 15 with a crank pin 24. The position of the crank pin 24 is offset from the center of the crank shaft 15 by a distance S, that is, the connecting rod 25 is eccentrically supported with respect to the crank shaft 15. The bottom end of the connecting rod 25 is supported on an unillustrated spherical bearing disposed at the base end of a main shaft 26. To the leading end of the main shaft 26, a cutter T is detachably attached.

The main shaft 26 penetrates a cylindrical guide member 27, and is supported by the inner circumferential surface of the guide member 27. The main shaft 26 thus supported is capable of sliding. A groove (not illustrated) is formed in the inner circumferential surface of the guide member 27 so as to correspond to the helical angle of the helical gear into which the workpiece W is to be formed. An engagement portion (not illustrated) formed in the outer circumferential surface of the main shaft 26 engages with the groove. Accordingly, as the main shaft 26 slides inside the guide member 27, the main shaft 26 performs twisting (spiral) motion corresponding to the helical angle of the helical gear into which the workpiece W is to be formed.

A rotary table 28 is rotatably supported at a position opposed to the column 11. Onto the top surface of the rotary table 28, the workpiece W is detachably attached with an unillustrated attachment jig.

A main balancer weight 41 of a mass of $m_{B2}$ is detachably attached to the front-end side of the crank shaft 15 while a main balancer weight 42 of amass of $m_{B1}$ is detachably attached to the rear-end side of the crank shaft 15. The main balancer weight 41 is formed into a substantially semicircular shape. The main balancer weight 41 is disposed at the inner side of the connecting rod 25 in the Y-axis direction, and the phase of the main balancer weight 41 is offset from the phase of the crank pin 24 by 180°. In addition, the main balancer weight 42 is formed also into a substantially semicircular shape. The main balancer weight 42 is disposed at the outer side of the pulley 22 in the Y-axis direction, and the phase of the main balancer weight 42 is the same as the phase of the crank pin 24, that is, the phase of the main balancer weight 42 is offset from the phase of the main balancer weight 41 by 180°.

A sub balancer weight 43 of a mass of $m_{s2}$ is detachably attached to the front end of the balancer shaft 16 while a sub balancer weight 44 of a mass of $m_{S1}$ is detachably attached to the rear end of the balancer shaft 16. In addition, a sub balancer weight 45 of a mass of $m_{s2}$ is detachably attached to the front end of the balancer shaft 17 while a sub balancer weight 46 of a mass of $m_{S1}$ is detachably attached to the rear end of the balancer shaft 17. These sub balancer weights 43 to 46 are formed into substantially semicircular shapes. The phases of the sub balancer weights 43 and 45 are offset from the phases of the sub balancer weights 44 and 46 by 180°, respectively.

Accordingly, to cut the workpiece W with the cutter T, the main-shaft motor 12 is rotated, and the rotation of the main-shaft motor 12 is transmitted via the timing belt 23 so as to rotate the crank shaft 15. The rotation of the crank shaft 15 makes the connecting rod 25 rotate. The rotation of the connecting rod 25 makes the main shaft 26 move reciprocally in the Z-axis directions by a stroke width of 2S. In this event, the main shaft 26 slides inside the guide member 27. Accordingly, the rotating cutter T that meshes with the rotating workpiece W moves reciprocally by a stroke width that is longer than the face width of the workpiece W, and the cutter T performs twisting motion corresponding to the helical angle that the workpiece W is to have. In this way, the workpiece W is cut with the cutter T.

Incidentally, when the crank shaft 15 rotates, the balancer shafts 16 and 17 also rotate. When $m_{rev}$ denotes a movable mass for the stroke adjustment of the main shaft 26, and M denotes a mass equivalent to a reciprocating portion, the translational unbalance between the movable mass for the stroke adjustment $m_{rev}$ and the mass equivalent to the reciprocating portion M in the Z-axis direction is designed to be resolved by attaching the main balancer weight 41 of a mass of $m_{B2}$ and the main balancer weight 42 of a mass of $m_{B1}$. In addition, although the translational unbalance between the main balancer weight 41 of a mass of $m_{B2}$ and the main balancer weight 42 of a mass of $m_{B1}$ in the X-axis direction is greater than the movable mass for the stroke adjustment $m_{rev}$, the translational unbalance is designed to be resolved by attaching the sub balancer weights 43 and 45 each of which has a mass of $m_{S2}$ and the sub balancer weights 44 and 46 each of which has a mass of $m_{S1}$. Incidentally, the position of the mass center of the main shaft 26 and the position of the mass center of the main balancer weight 41 are offset from each other in the axis direction of the crank shaft (Y-axis direction) by their attachment structure. Nevertheless, the balance in the axial direction of the crank shaft 15 can be achieved by attaching the main balancer weight 42 at the opposite side to the side where the main balancer weight 41 is attached.

Subsequently, when the balancer weights 41 to 46 are selected, or when the masses $m_{B1}$, $m_{B2}$, $m_{S1}$, and $m_{S2}$ are set, the forces in the X-axis direction and in the Y-axis direction as well as the rotational moments about the X-axis and the Z-axis need to be balanced, with the twisting motion of the main shaft 26 corresponding to the helical angle to be formed in the workpiece W being taken into consideration. To put it differently, the balance needs to be achieved under the condition that, as the mass equivalent to the reciprocating portion M, not only the simple addition of the mass of the connecting rod 25 and the mass of the main shaft 26 but also an equivalent mass of the twisting motion of the main shaft 26 has to be taken into consideration.

Now, assume as FIGS. 3 to 5 show, that $m_{B1}$, $M_{B2}$: masses of the main balancer weights,
$m_{S1}$, $m_{S2}$: masses of the sub balancer weights,
M: mass equivalent to the reciprocating portion,
$m_{rev}$: movable mass for the stroke adjustment of the main shaft,
θ: rotational angle [rad],
ω: rotational angle speed [rad/s]=(d/dt) θ,
S: main-shaft stroke width/2,
L: offset amount of the center of the mass of the main shaft in the Y-axis direction,
$h_1$: distance in the Y-axis direction from the X-axis to the main balancer weight
$h_{s1}$, $h_{s2}$: distances in the Y-axis direction from the X-axis to the sub balancer weights,
$R_{B1}$, $R_{B2}$: radii of rotation of the main balancer weights (distances to the centers of mass),
$R_{S1}$, $R_{S2}$: radii of rotation of the sub balancer weights (distances to the centers of mass),
h: length of the connecting rod,
G: mass center of the connecting rod,
a, b: lengths to the mass center from ends of the connecting rods.

In addition, the mass equivalent to the reciprocating portion M can be given by the following mathematical expression (1).

[Formula 1]

$$M=m_g+m_{gr}+m_{gc}=m_g+I\cdot(2\pi/L_g)^2+m_c\cdot b/h \quad (1)$$

where $m_g$: mass of the reciprocating portion of the main shaft (including the cutter T and the like),
$m_{gr}$: mass equivalent to the main-shaft twisting motion at the time of forming a helical gear,
$m_{gc}$: part of the mass of the connecting rod contributing to the translational portion,
I: rotational moment of inertia of the main shaft rotating about the Z-axis,
$L_g$: lead of the main shaft corresponding to the helical angle of the helical gear,
$m_c$: mass of the connecting rod.

Then, the balance of forces in the Z-axis direction, the balance of forces in the X-axis direction, the balance of rotational moments about the Z-axis, and the balance of rotational moments about the X-axis can be expressed by the following mathematical expressions (2) to (5).

[Formula 2]

$$(M+m_{rev})\cdot\omega^2\cdot S\cdot\cos\theta+m_{B1}\cdot\omega^2\cdot R_{B1}\cdot\cos\theta=m_{B2}\cdot\omega^2\cdot R_{B2}\cdot\cos\theta \quad (2)$$

$$2m_{S1}\cdot\omega^2\cdot R_{S1}\cdot\sin\theta+2m_{S2}\cdot\omega^2\cdot R_{S2}\cdot\sin\theta+m_{B1}\cdot\omega^2\cdot R_{B1}\sin\theta+m_{rev}\cdot\omega^2\cdot S\cdot\sin\theta=m_{B2}\cdot\omega^2\cdot RB^2\cdot\sin\theta \quad (3)$$

$$m_{rev}\cdot\omega^2\cdot S\cdot L\cdot\sin\theta+2m_{S2}\cdot\omega^2\cdot R_{S2}\cdot h_{S2}\cdot\sin\theta-m_{B1}\omega^2\cdot R_{B1}\cdot h_1\cdot\sin\theta-2m_{S1}\omega^2\cdot R_{S1}\cdot h_{S1}\cdot\sin\theta=0 \quad (4)$$

$$m_{B1}\omega^2\cdot R_{B1}\cdot h_1\cdot\cos\theta=(M+m_{rev})\cdot\omega^2\cdot S\cdot L\cdot\cos\theta \quad (5)$$

In addition, the mathematical expressions (2) to (5) given above can be expressed respectively by the following mathematical expressions (2)' to (5)'.

[Formula 3]

$$(M+m_{rev})\cdot S+m_{B1}\cdot R_{B1}=m_{B2}\cdot R_{B2} \quad (2)'$$

$$2m_{S1}\cdot R_{S1}+2m_{S2}\cdot R_{S2}+m_{B1}\cdot R_{B1}\cdot m_{rev}\cdot S=m_{B2}\cdot R_{B2} \quad (3)'$$

$$m_{rev}\cdot S\cdot L+2m_{S2}\cdot R_{S2}\cdot h_{S2}-m_{B1}\cdot R_{B1}\cdot h_1-2m_{S1}\cdot R_{S1}\cdot h_{S1}=0 \quad (4)'$$

$$m_{B1}\cdot R_{B1}\cdot h_1-(M+m_{rev})\cdot S\cdot L=0 \quad (5)'$$

As has been shown above, the masses $m_{B1}$, $m_{B2}$, $m_{S1}$, and $m_{S2}$ can be set so as to satisfy the mathematical expressions (2)' to (5)'' given above.

Note that the positions of the sub balancer weights 43 and 45 in the Y-axis direction may be located at the same position as the position of the mass center of the main shaft 26 in the Y-axis direction. To put it differently, it is allowed that $h_{S2}=L$. Accordingly, the mass $m_{S1}$ of each of the sub balancer weights 44 and 46 can be made to be zero permanently, so that it is no longer necessary to provide the sub balancer weights 44 and 46. As a consequence, a simpler configuration of the vibration-reduction mechanism can be achieved, and an easier selection of the balancer weights can be achieved.

As has been described thus far, according to the vibration-reduction mechanism for a gear cutting machine of the present invention, when the balancer weights 41 to 46 are selected for the cutting a workpiece W into a helical gear, the forces in the X-axis direction and in the Y-axis direction as well as the rotational moments about the X-axis and about the Z-axis are balanced, with the twisting motion of the main shaft 26 corresponding to the helical angle to be formed in the work W being taken into consideration. Specifically, when the work W is formed into a helical gear, the main shaft 26 moves reciprocally with the lead (angle) $L_g$ corresponding to the helical angle to be formed in the work W. With the mass equivalent ($m_{gr}$) to the twisting motion of the main shaft 26 being taken into consideration, the masses $m_{B1}$, $m_{B2}$, $m_{S1}$, and $m_{S2}$ are set (calculated) and thus the balancer weights 41 to 46 are selected. As a consequence, the vibrations generated in the machine can be reduced with certainty.

INDUSTRIAL APPLICABILITY

The present invention can be applied to a vibration-reduction mechanism for a gear cutting machine capable of finely adjusting the position where a balancer weight is to be attached when the stroke width of the main shaft is changed.

The invention claimed is:

1. A vibration-reduction mechanism for a gear cutting machine that performs gear cutting on a gear blank with a rotary tool attached to a main shaft made to move reciprocally by a crank mechanism, by imparting to the main shaft a twisting motion corresponding to a helical angle to be formed in the gear blank, the vibration-reduction mechanism comprising:
a first balancer shaft and a second balancer shaft which are arranged in parallel to a crank shaft of the crank mechanism, and which rotate synchronously with the crank shaft at a same speed as a speed of the crank shaft, the first balancer shaft rotating in an opposite direction to a rotational direction of the crank shaft and the second balancer shaft rotating in a same direction as the rotational direction of the crank shaft;
main balancer weights detachably attached onto the crank shaft so as to reduce vibrations in an axial direction of the main shaft; and
sub balancer weights detachably attached onto the first and the second balancer shafts so as to reduce vibrations caused by translational unbalance between the main balancer weights in directions that are orthogonal to the axial direction of the main shaft, wherein
the main balancer weights and the sub balancer weights are selected on the basis of a stroke width of the main shaft and on the basis of the helical angle to be formed in the gear blank.

2. The vibration-reduction mechanism for a gear cutting machine according to claim 1, wherein
the main balancer weights include:
a front-side balancer weight having a phase being offset by 180° from a phase of the main shaft eccentrically supported with respect to a center of the crank shaft; and
a rear-side balancer weight having a phase being offset by 180° from the phase of the front-side balancer weight so as to solve an imbalance caused by the offset, in an axial direction of the crank shaft, between the position of a mass center of the main shaft and the position of a mass center of the front-side balancer weight.

3. The vibration-reduction mechanism for a gear cutting machine according to claim 1, wherein
the sub balancer weights are disposed, in the axial direction of the crank shaft, at same positions as the position of the mass center of the main shaft in the axial direction of the crank shaft.

* * * * *